US007575291B2

(12) United States Patent
Kobayashi

(10) Patent No.: US 7,575,291 B2
(45) Date of Patent: Aug. 18, 2009

(54) RECORDING APPARATUS

(75) Inventor: Isao Kobayashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 326 days.

(21) Appl. No.: 11/449,602

(22) Filed: Jun. 9, 2006

(65) Prior Publication Data

US 2006/0279586 A1 Dec. 14, 2006

(30) Foreign Application Priority Data

Jun. 10, 2005 (JP) ............................ 2005-170387

(51) Int. Cl.
*B41J 29/38* (2006.01)
*B41J 2/05* (2006.01)
*G06F 3/12* (2006.01)

(52) U.S. Cl. .............................. 347/5; 347/10; 347/57; 358/1.15

(58) Field of Classification Search .................. 347/10, 347/5, 57; 358/1.15
See application file for complete search history.

(56) References Cited

U.S. PATENT DOCUMENTS

2005/0116975 A1* 6/2005 Kasai .......................... 347/10

FOREIGN PATENT DOCUMENTS

JP 2000 158643 6/2000

* cited by examiner

*Primary Examiner*—Matthew Luu
*Assistant Examiner*—Jannelle M Lebron
(74) *Attorney, Agent, or Firm*—Baker Botts L.L.P.

(57) ABSTRACT

A recording apparatus including: (a) a recording head unit having actuators and operable to perform a recording operation using at least one recording material that is ejected by activation of the actuators; (b) a main circuit operable to output activator signals for activating the actuators, and drive waveform signals for controlling ejection of the at least one recording material; and (c) a drive circuit operable to receive the activator signals and the drive waveform signals, generate drive signals based on the output activator signals and the drive waveform signals, and supply the generated drive signals to the actuators. The main circuit generates a merged signal into which at least part of the activator signals and at least one of the drive waveform signals are serially merged, and transmits the merged signal to the drive circuit. The drive circuit retrieves the at least part of the activator signals and the at least one of the drive waveform signals from the transmitted merged signal.

6 Claims, 3 Drawing Sheets

RECORDING APPARATUS

This application is based on Japanese Patent Application No. 2005-170387 filed on Jun. 10, 2005, the content of which is incorporated hereinto by reference.

BACKGROUND OF THE INVENTION

1. Field of the Invention

The present invention relates to a recording apparatus, for example, of inkjet type.

2. Discussion of Related Art

As a kind of recording apparatus, there is known an inkjet type recording apparatus for performing a recording operation. During the recording operation, an inkjet head unit is caused to eject recording materials (ink droplets) toward a recording medium, while a carriage carrying the head unit is moved such that the head unit is moved relative to the recording medium with a predetermined spacing distance therebetween being maintained.

As such an inkjet type recording apparatus, there is a recording apparatus in which a head driver unit mounted on the carriage is arranged to receive various data signals such as drive data signals (recording data signals) and drive waveform signals that are outputted from a main circuit disposed in a stationary main body of the apparatus. The inkjet head unit (hereinafter referred to as "recording head unit") is operated by the head driver unit, so as to eject the ink droplets through a plurality of nozzles formed in the head unit.

In the inkjet type recording apparatus, for performing a recording operation with gradation control, a plurality of drive waveform signals having respective different drive waveforms have to be available so that the recording material can be ejected as an ink droplet that is variable in its size. Further, for reducing a peak value of electric power consumed by the recording head unit and for avoiding a so-called "cross talk" between adjacent ink chambers of the recording head unit, the drive waveform signals supplied for ink ejections through respective nozzles arranged in each region or row have to be variable so as to be different from each other. Further, where a color recording operation is performed by using a plurality of different recording materials, there is a requirement of recording with the drive waveform signals having respective waveforms suitable for characteristics of the respective color inks. Consequently, the required number of kinds of drive waveform signals are increased for satisfying the above requirements. The increase in the number of kinds of drive waveform signals leads to increase in the number of signal wires required for supplying the drive waveform signals to the drive circuits of the head driver unit.

The increase in the number of the signal wires is disadvantageous in view of cost and maintenance performance. Particularly, where a flexible flat cable is used for transmitting the signals from the main circuit disposed in the stationary main body to the head driver unit carried by the carriage, the flexible flat wire has a width inevitably increased by the increased number of the signal wires, thereby necessitating a complicated disposition of the flexible flat cable and even increasing a load exerted on the carriage moved relative to the stationary main body.

In view of the above-described problems, there have been made various attempts to reduce the number of the signal wires for transmitting the drive waveform signals from the main circuit to the head driver unit. For example, there was proposed an arrangement, as disclosed in JP-2000-158643A, in which waveform-related data (e.g., data representative of pulse width) required for generation of drive waveform signals are serially transmitted to each of drive-waveform-signal generator circuits disposed in the recording head unit prior to a recording operation, and the drive waveform signals are generated based on the waveform-related data by the drive-waveform-signal generator circuits upon initiation of the recording operation.

In the above-described proposed arrangement, the number of the signal wires for transmitting the drive waveform signals from the main circuit to the head driver unit can be made smaller than in the conventional arrangement. However, the plurality of drive-waveform-signal generator circuits as extra components are required for the generations of the respective different drive waveform signals, whereby the recording head unit is inevitably increased in weight.

SUMMARY OF THE INVENTION

The present invention was made in view of the background prior art discussed above. It is therefore an object of the invention to provide a recording apparatus having an arrangement for making it possible to reduce the number of the signal wires used for transmitting the drive waveform signals and activator signals from the main circuit (disposed in the stationary main body of the apparatus) to the head driver unit (carried by the carriage).

This object may be achieved by the present invention providing a recording apparatus including: (a) a recording head unit having actuators and operable to perform a dot recording operation using at least one recording material that is ejected by activation of the actuators; (b) a main circuit operable to output activator signals for activating the actuators, and drive waveform signals for controlling ejection of the at least one recording material; and (c) a drive circuit operable to receive the activator signals and the drive waveform signals, generate drive signals based on the output activator signals and the drive waveform signals, and supply the generated drive signals to the actuators, wherein the main circuit has (b-1) a merged-signal generator operable to generate a merged signal into which at least part of the activator signals and at least one of the drive waveform signals are serially merged, and (b-2) a merged-signal transmitter operable to transmit the merged signal to the drive circuit, and wherein the drive circuit retrieves the at least part of the activator signals and the at least one of the drive waveform signals from the transmitted merged signal, such that the retrieved at least part of the activator signals and the retrieved at least one of the drive waveform signals are separated from each other. It is noted that the term "merged signal into which at least part of the activator signals and at least one of the drive waveform signals are serially merged" is interpreted to mean a signal into which the at least part of the activator signals and the at least one of the drive waveform signals are integrated in accordance with a predetermined rule. The "part of the activator signals" may be provided by either a part of one of the activator signals or an entirety of one of the activator signals.

In the recording apparatus according to the invention, the at least part of the activator signals and the at least one of the drive waveform signals are serially merged into the merged signal by the merged-signal generator of the main circuit, and the thus generated merged signal is transmitted to the drive circuit by the merged-signal transmitter of the main circuit. The drive circuit retrieves the at least part of the activator signals and the at least one of the drive waveform signals from the merged signal, such that the retrieved at least part of the activator signals and the retrieved at least one of the drive waveform signals are separated from each other. That is, the at least part of the activator signals and the at least one of the drive waveform signals are retrieved or restored to their original forms as before they are merged into the merged signal in the main circuit.

Thus, since the at least part of the activator signals and the at least one of the drive waveform signals are serially transmitted as the merged signal from the main circuit to the drive circuit, the number of the required signal wires can be made smaller than where the at least part of the activator signals and the at least one of the drive waveform signals are transmitted separately from each other.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENT

Figure 1:
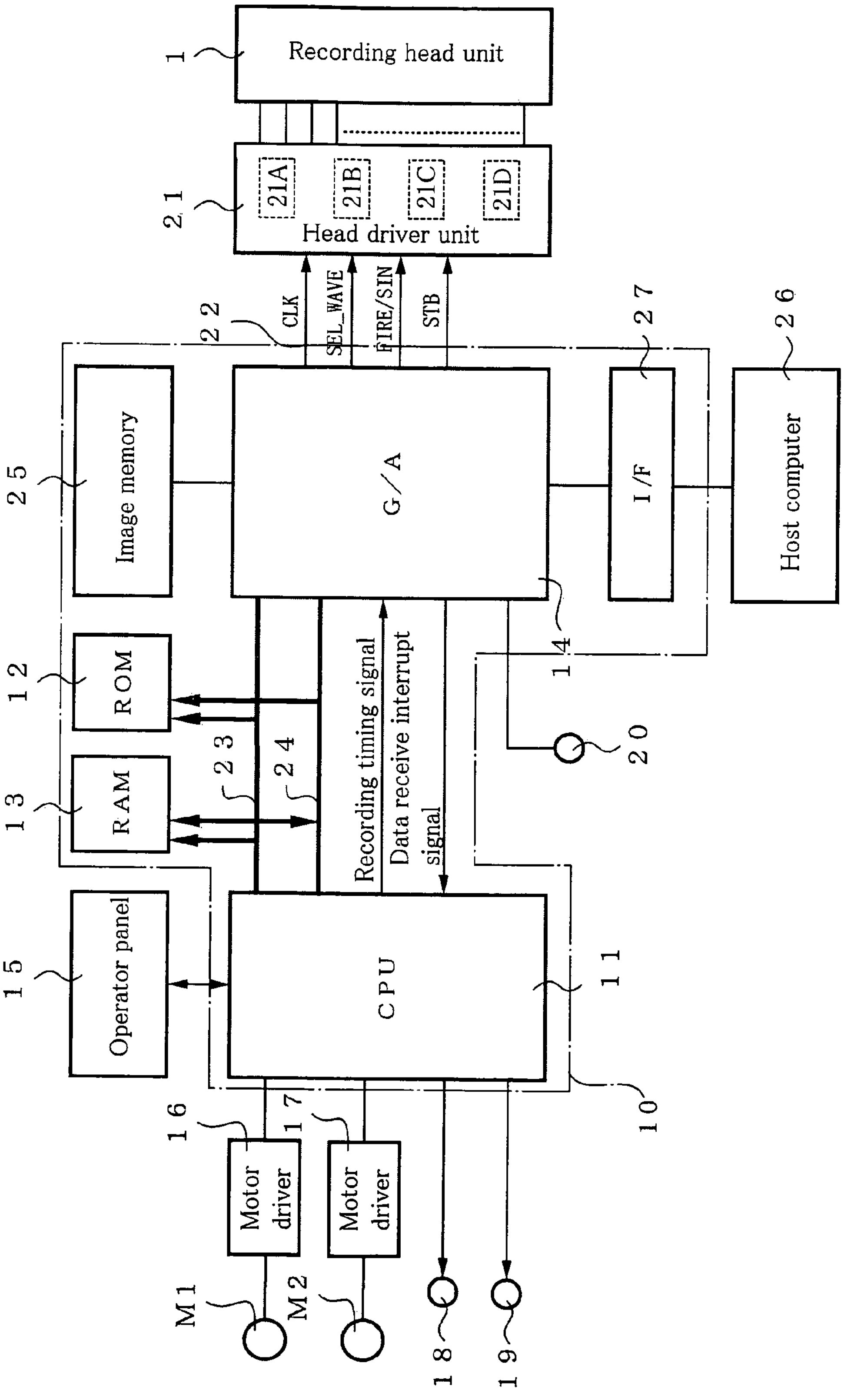
FIG. 1 is a block diagram showing an electrical arrangement in an inkjet-type recording apparatus constructed according to an embodiment of the invention.

There will be described a recording apparatus constructed according to the invention, with reference to FIGS. 1-3. This recording apparatus is of a known inkjet type, and includes a carriage (not shown) reciprocatively movable along a recording medium, and a recoding head unit mounted on the carriage and operable to eject ink droplets toward the recording medium.

The recording apparatus has a controller principally constituted by a main circuit 10 that includes: CPU 11 for processing drive data signals (print data signals) and controlling operation of the recording apparatus; ROM 12 for storing programs executed by the CPU 11; RAM 13 for temporarily storing data during processing of the data signals by the CPU 11; and a gate array (G/A) 14 provided by a gate circuit LSI. To the CPU 11, there are connected: an operator panel 15 through which the user enters desired commands (e.g., printing command) into the CPU 11; a motor driver 16 for driving a carriage motor M1 (for reciprocatively moving the carriage); a motor driver 17 for driving a paper feed motor M2 (for feeding the recording medium in the form of a recording paper sheet in a predetermined direction); a paper presence sensor 18 for detecting a leading edge of the paper sheet; a home position sensor 19 for confirming that the carriage carrying a recording head unit 1 is positioned in its home position when it is returned to the home position.

The recording head unit 1 includes four recording portions that are respectively operable to eject cyan, magenta, yellow and black inks as a plurality of recording materials. The four recording portions of the recording head unit 1 are driven by respective drive circuits 21A, 21B, 21C, 21D of a head driver unit 21 that is mounted together with the recording head unit 1 on the carriage. The head driver unit 21 and the gate array 14 are connected through a flexible flat cable 22 (harness cable), so that the head driver unit 21 can be controlled by the gate array 14.

Although not being specifically illustrated in the drawings, each of the recording portions of the recording head unit 1 has: a plurality of actuators (not shown) each of which is provided by a piezoelectric element and an electrostriction element; a plurality of ink chambers storing therein the inks; and a plurality of nozzles (not shown) held in communication with the respective ink chambers. The volumes of the respective ink chambers are changed (increased and reduced) independently of each other, by activations of the respective actuators. Thus, the ink in the form of an ink droplet is ejected through each nozzle when the volume of the corresponding ink chamber is changed. The actuators are activated by the head driver unit 21 that is connected to electrodes provided in the recording head unit 1. The head driver unit 21 is controlled by the gate array 14 to generate a drive signal OUT having a waveform suitable for the recording head unit 1 and to apply the generated drive signal OUT to each of the electrodes. To the gate array 14, there is connected an encoder 20 that is arranged to detect a position of the carriage 2.

The CPU 11 is connected to the ROM 12, RAM 13 and gate array 14 via an address bus 23 and a data bus 24. The CPU 11 generates a recording timing signal and a reset signal in accordance with the programs prestored in the ROM 12, and transmits the signals to the gate array 14. Drive waveform signals FIRE are prestored in the ROM 12, or are transmitted together with the drive data signals SIN from a host computer (personal computer) 26 via an interface 27 to the ROM 12 or an image memory 27 so as to be stored in the RAM 13 or image memory 27. The drive waveform signal sets stored in the ROM 12, RAM 13 or image memory 27 is supplied to the gate array 14, in a recording operation.

The gate array 14 receives an image data transmitted from the host computer 26 as an external device via the interface 27, and supplies the image data to the image memory 25 so that the image data is temporarily stored in the image memory 25. Further, the gate array 14 generates a data receive interrupt signal, based on the drive data signals transmitted from the host computer 26 via the interface 27, and supplies the data receive interrupt signal to the CPU 11. The gate array 14 generates a clock signal CLK and a strobe control signal STB, based on the recording timing signal and control signals supplied from the encoder 20, and transmits a plurality of merged signals FIRE/SIN and a drive-waveform-signal-level change indicator signal SEL_WAVE, in synchronization with the clock signal CLK, to the head driver 21.

The drive data signals SIN and the drive waveform signals FIRE are transmitted to the gate array 14, and are merged into the merged signals FIRE/SIN in accordance with a program stored in the ROM 12 and executed by the CPU 11. That is, the gate array 14 serves as a merged-signal generator for generating each merged signal FIRE/SIN into which at least part of the drive data signals SIN as activator signals and at least one of the drive waveform signals FIRE are serially merged. The clock signal CLK is alternately placed in its high and low level states (first and second level states), while the drive-waveform-signal-level change indicator signal SEL_WAVE is alternately placed in its high and low level states (first and second level states). In the present embodiment, as shown in FIG. 3, the drive-waveform-signal-level change indicator signal SEL_WAVE is placed in the high level when any of the drive waveform signals FIRE_1-6 is changed in level, and is placed in the low level when none of the drive waveform signals FIRE_1-6 is changed in level. Each merged signal FIRE/SIN is generated to have a plurality of drive-waveform-signal portions WD indicative of level of the corresponding drive waveform signal FIRE (i.e., indicative of whether the drive waveform signal FIRE is in the high or low level) and a plurality of activator-signal portions DD constituted by the drive data signals SIN, so that each merged signal FIRE/SIN into which the drive waveform signal FIRE and parts of the drive data signals SIN are merged is generated. The drive-waveform-signal portions WD and the activator-signal portions DD are alternately arranged in the generated merged signal FIRE/SIN. The gate array 14, serving as also a merged-signal transmitter, transmits each merged signal FIRE/SIN, such that the drive-waveform-signal portions WD are synchronized with placement of the clock signal CLK in the high level state when the drive-waveform-signal-level change indicator signal SEL_WAVE is being placed in the high level state, and such that the activator-signal portions DD are synchronized with placement of the clock signal CLK in the high level state when the drive-waveform-signal-level change indicator signal SEL_WAVE is being placed in the low level state.

The clock signal CLK is placed in the high level state at a constant interval, so that clock pulses are generated at a constant interval. In FIG. 3, some of the clock pulses are numbered while the other of the clock pulses are not numbered. The numbered clock pulses are those generated when the drive-waveform-signal-level change indicator signal SEL_WAVE is being placed in the low level state, while the non-numbered clock pulses are those generated when the drive-waveform-signal-level change indicator signal SEL_WAVE is being placed in the high level state. Each drive data signal SIN for activating the corresponding actuator, namely, for serving for the corresponding nozzle is provided by a 3-bit signal. The 3-bit drive data signal SIN is divided into three parts which are incorporated in the activator-signal portions DD of the respective three merged signals FIRE/SIN. For example, as shown in FIG. 3, the three parts of the drive data signal SIN for serving for the 46th nozzle are incorporated in the activator-signal portions DD of the respective three merged signals FIRE_1/SIN_0-0~46, FIRE_2/SIN_1-0~46, FIRE_3/SIN_2-0~46, so as to be synchronized with the clock pulse of the clock signal CLK that is numbered "1" in FIG. 3. The three parts of the drive data signal SIN for serving for the 93rd nozzle are incorporated in the activator-signal portions DD of the respective three merged signals FIRE_4/SIN_0-47~93, FIRE_5/SIN_1-47~93, FIRE_6/SIN_2-47~93, so as to be synchronized with the clock pulse of the clock signal CLK that is numbered "1". Similarly, the three parts of each of the drive data signals SIN for serving for a corresponding one of the 45th though 0th nozzles are incorporated in the activator-signal portions DD of the respective three merged signals FIRE_1/SIN_0-0~46, FIRE_2/SIN_1-0~46, FIRE_3/SIN_2-0~46, so as to be synchronized with a corresponding one of the clock pulses of the clock signal CLK that are numbered "2"-"46" in FIG. 3. The three parts of each of the drive data signals SIN for serving for a corresponding one of the 92nd though 47th nozzles are incorporated in the activator-signal portions DD of the respective three merged signals FIRE_4/SIN_0-47~93, FIRE_5/SIN_1-47~93, FIRE~6/SIN_2-47~93, so as to be synchronized with a corresponding one of the clock pulses of the clock signal CLK that are numbered "2"-"46" in FIG. 3. Thus, each one cycle of the transmissions of all the drive data signals SIN is completed with the clock pulse of the clock signal CLK that is numbered "46".

The transmissions of the clock signal CLK, drive-waveform-signal-level change indicator signal SEL_WAVE and merged signals FIRE/SIN from the gate array 14 to the head driver unit 21 are made through the flexible flat cable 22 that connects the gate array 21 and the head driver unit 21.

The four drive circuits 21A, 21B, 21C, 21D incorporated in the head deriver unit 21 are electrically connected to the actuators of respective four recording portions of the recording head unit 1 that are arranged to eject the cyan, magenta, yellow and black inks, respectively. Since the four drive circuits 21A, 21B, 21C, 21D are identical with each other in basic arrangement, only the drive circuit 21A as one of the four drive circuits will be described with reference to FIG. 2.

Figure 2:
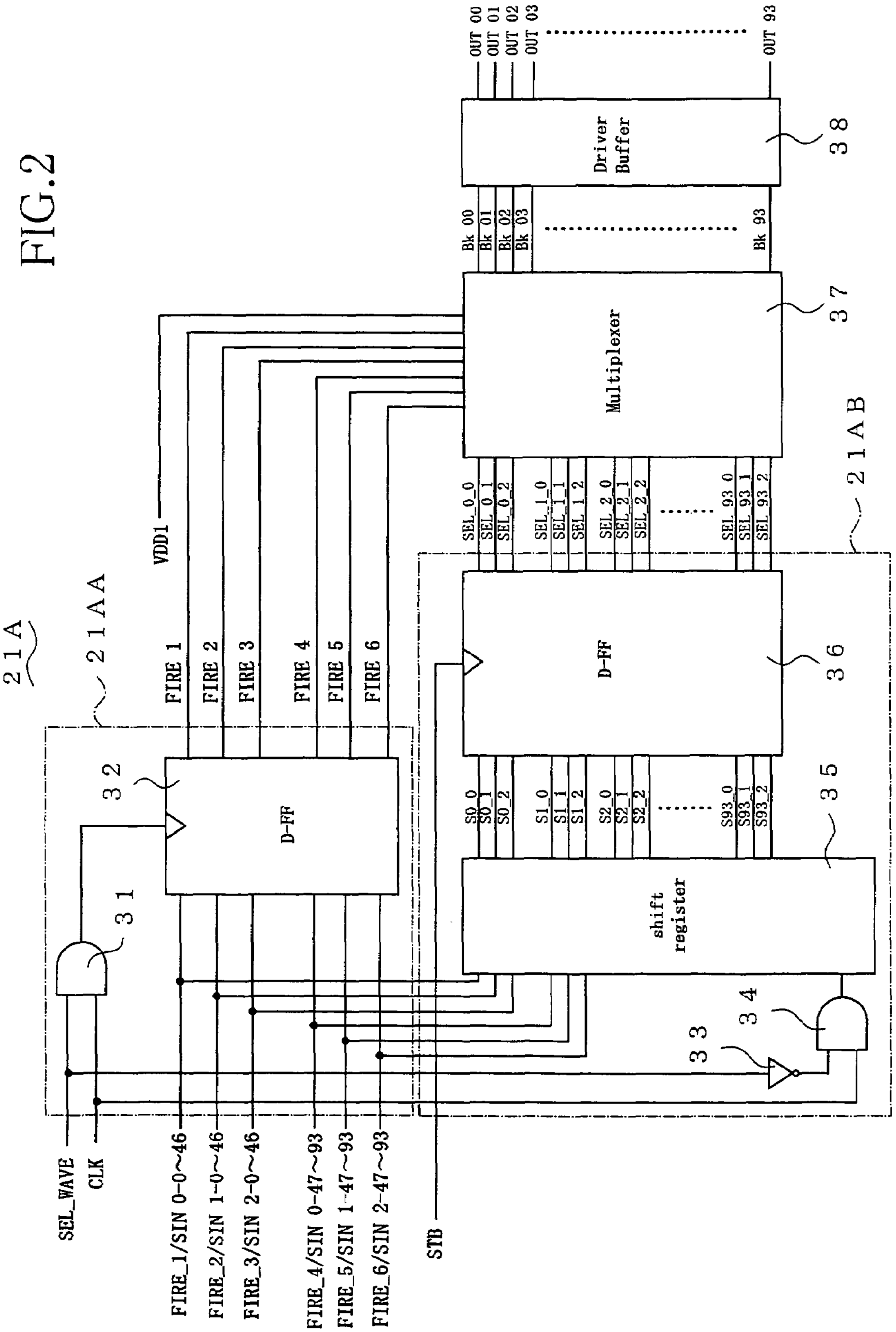
FIG. 2 is a block diagram showing a drive circuit of a head driver unit of the recording apparatus of FIG. 1.
Figure 3:
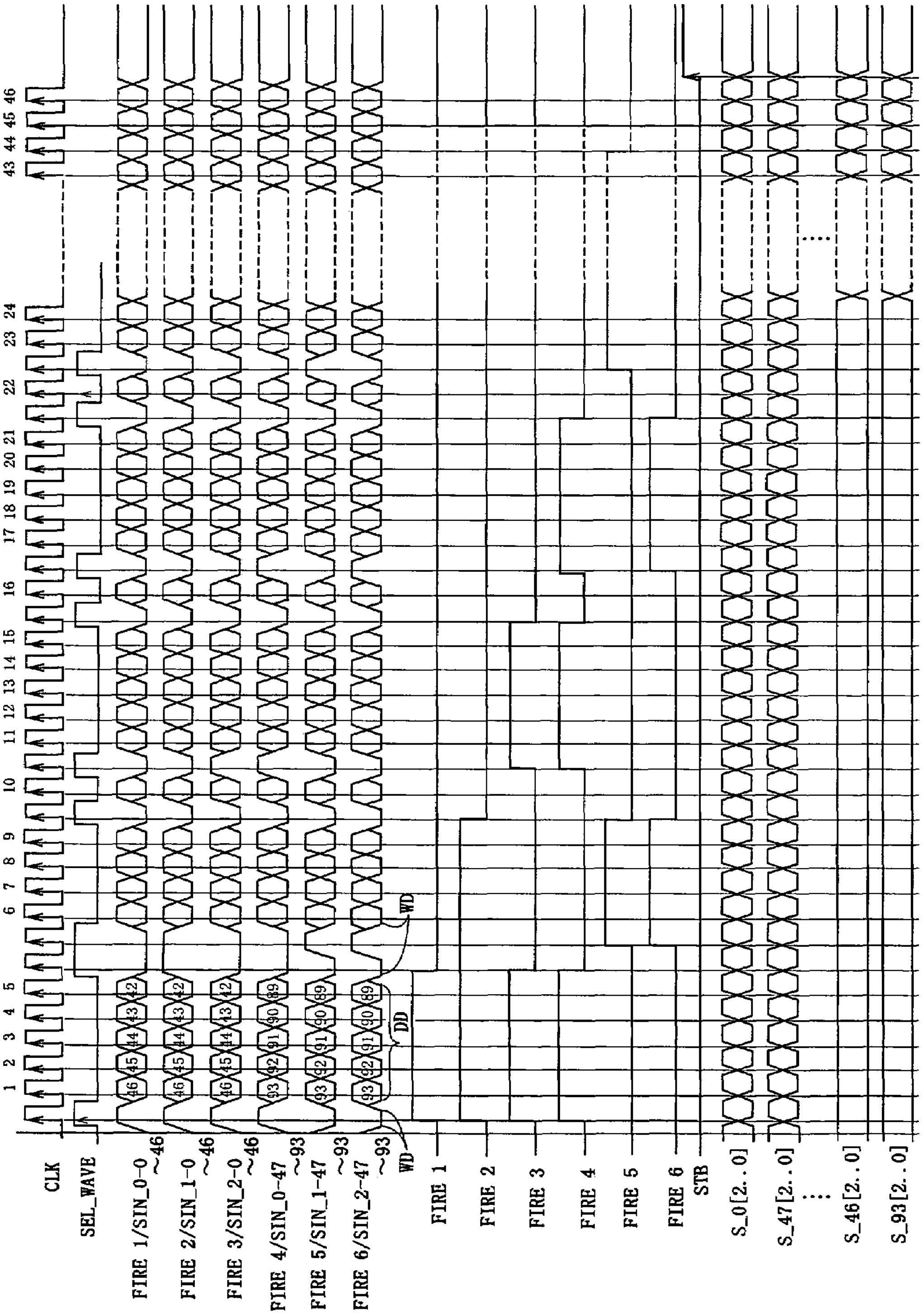
FIG. 3 is a timing chart showing an operation of the drive circuit of FIG. 2.

As shown in FIG. 2, the six merged signals FIRE_1/SIN_0-0~46, FIRE_2/SIN_1-0~46, FIRE_3/SIN_2-0~46, FIRE_4/SIN_0-47~93, FIRE_5/SIN_1-47~93, FIRE_6/SIN_2-47~93, the clock signal CLK, the drive-waveform-signal-level change indicator signal SEL_WAVE and the strobe control signal STB are inputted to the drive circuit 21A. The merged signal FIRE_1/SIN_0-0~46 incorporates therein the drive waveform signal FIRE_1 and the drive data signal parts SIN_0-0~46 (parts of the drive data signals SIN for serving for the 46th though 0th nozzles) that are serially arranged therein. The merged signal FIRE_2/SIN_1-0~46 incorporates therein the drive waveform signal FIRE_2 and the drive data signal parts SIN_1-0~46 (parts of the drive data signals SIN for serving for the 46th though 0th nozzles) that are serially arranged therein. The merged signal FIRE_3/SIN_2-0~46 incorporates therein the drive waveform signal FIRE_3 and the drive data signal parts SIN_2-0~46 (parts of the drive data signals SIN for serving for the 46th though 0th nozzles) that are serially arranged therein. The merged signal FIRE_4/SIN_0-47~93 incorporates therein the drive waveform signal FIRE_4 and the drive data signal parts SIN_0-47~93 (parts of the drive data signals SIN for serving for the 93rd though 47th nozzles) that are serially arranged therein. The merged signal FIRE_5/SIN_1-47~93 incorporates therein the drive waveform signal FIRE_5 and the drive data signal parts SIN_1-47~93 (parts of the drive data signals SIN for serving for the 93dr though 47th nozzles) that are serially arranged therein. The merged signal FIRE_6/SIN_2-47~93 incorporates therein the drive waveform signal FIRE_6 and the drive data signal parts SIN_2-47~93 (parts of the drive data signals SIN for serving for the 93rd though 47th nozzles) that are serially arranged therein.

The drive circuit 21A has a drive-waveform-signal retriever 21AA operable to retrieve the drive waveform signals FIRE_1~6 from the merged signals FIRE/SIN, and an activator-signal retriever 21AB operable to retrieve the drive data signals SIN as the activator signals from the merged signals FIRE/SIN. The drive-waveform-signal retriever 21AA extracts the drive-waveform-signal portions WD of the merged signals FIRE/SIN in response to the placement of the clock signal CLK in the high level state when the drive-waveform-signal-level change indicator signal SEL_WAVE is being placed in the high level state, so as to retrieve the drive waveform signals FIRE_1~6 each having the level that is changed as indicated by the extracted drive-waveform-signal portions WD. The activator-signal retriever 21AB extracts the activator-signal portions DD of the merged signals FIRE/SIN in response to the placement of the clock signal in the high level state when the drive-waveform-signal-level change indicator signal SEL_WAVE is being placed in the low level state, so as to retrieve the drive data signals SIN that constitutes the extracted activator-signal portions DD.

Specifically described, the drive-waveform-signal retriever 21AA has a first AND gate 31 into which the clock signal CLK and the drive-waveform-signal-level change indicator signal SEL_WAVE are inputted, and a D flip-flop 32 into which the six merged signals FIRE_1/SIN_0-0~46, FIRE_2/SIN_1-0~46, FIRE_3/SIN_2-0~46, FIRE_4/SIN_0-47~93, FIRE_5/SIN_1-47~93, FIRE_6/SIN_2-47~93 and an output of the first AND gate 31 are inputted. The D flip-flop 32 serves as a drive-waveform-signal-portions extractor for extracting the drive-waveform-signal portions WD of the merged signals FIRE/SIN indicative of the levels of the drive waveform signals FIRE_1~6.

The drive-waveform-signal retriever 21AA is operated according to an output generated by the first AND gate 31 that performs a logic operation analyzing the clock signal CLK and the drive-waveform-signal-level change indicator signal SEL_WAVE as inputs thereto. The first AND gate 31 outputs, as the output, a command commanding the D-flip-flop 32 to extract the drive-waveform-signal portions WD indicative of the levels of the drive waveform signals FIRE~1~6, in response to the placement of the clock signal CLK in the high level state when the drive-waveform-signal-level change indicator signal SEL_WAVE is being placed in the high level state, namely, in response to the placement of the clock signal CLK in the high level state when at least one of the drive waveform signals FIRE_1~6 is in transition from one of the high and low level states to the other of the high and low level states. After extracting the drive-waveform-signal portions WD, the D-flip-flop 32 retains the levels of the drive waveform signals FIRE_1~6 that are indicated by the drive-waveform-signal portions WD of the merged signals FIRE/SIN.

The drive-waveform-signal retriever 21AB has an inverter 33, a second AND gate 34 and a shift register 35. The drive-waveform-signal-level change indicator signal SEL_WAVE is inputted into the inverter 33. An output of the inverter 33 and the clock signal CLK are inputted into the second AND gate 34. An output of the second AND gate 34 and the six merged signals FIRE_1/SIN_0-0~46, FIRE_2/SIN_1-0~46, FIRE_3/SIN_2-0~46, FIRE_4/SIN_0-47~93, FIRE_5/SIN_1-47~93, FIRE_6/SIN_2-47~93 are inputted into the shift register 35, which is operable to extract the activator-signal portions DD of the merged signals FIRE/SIN constituted by the drive data signals SIN.

Where the recording head unit 1 is provided by a 94 channel multi-nozzle head unit in which a total of 94 ink chambers are provided for each of the recording materials, the shift register 35 is provided by a shift register having a bit length corresponding to a product of 94 and the number of bits of the drive data signal.

The second AND gate 34 outputs a command commanding the shift register 35 to extract the activator-signal portions DD of the merged signals, in response to the placement of the clock signal CLK in the high level state when the drive-waveform-signal-level change indicator signal SEL_WAVE is being placed in the low level state. After extracting the activator-signal portions DD, the shift register 35 serving as a serial-parallel converter converts the drive data signals SIN into parallel signals each including the drive data signal S*_0, S*_1,S*_2 ("*" represents any one of numbers 00~93).

The drive-waveform-signal retriever 21AB further has a latch circuit in the form of a D flip-flop 36 that is operated, upon a leading edge of each pulse of the strobe control signal STB transmitted from the gate array 14, to latch each of the drive data signal S*_0, S*_1,S*_2 supplied from the shift register 35.

The drive circuit 21A includes a multiplexer 37 and a driver buffer 38 in addition to the drive-waveform-signal retriever 21AA and the activator-signal retriever 21AB.

The six drive waveform signals FIRE_1~6 having the respective different waveforms (see FIG. 3) are supplied from the D flip-flop 32 to the multiplexer 37. The multiplexer 37 is operated to select one from among the six drive waveform signals FIRE_1~6, based on a content represented by the selection signal SEL_*_0, SEL_*_1, SEL_*_2 that is supplied from the D flip-flop 36, and to supply the selected drive waveform signal FIRE to the driver buffer 38.

In the present embodiment, the six drive waveform signals FIRE_1~6 are different from each other with respect to the number of pulses, and are repeatedly inputted to the multiplexer 37 at a constant cycle. The multiplexer 37 selects one of the six drive waveform signals FIRE_1~6, when receiving the selection signal SEL_*_0, SEL_*_1, SEL_*_2 included in the drive data signal. Specifically described, where the selection signal SEL_*_0, SEL_*_1, SEL_*_2 is 0, 0, 0, a non-recording (non-printing) is selected. Where the selection signal is 0, 1, 0, the drive waveform signal FIRE_1 is selected. Where the selection signal is 0, 0, 1, the drive waveform signal FIRE_2 is selected. Where the selection signal is 1, 0, 0, the drive waveform signal FIRE_3 is selected. Thus, the ejection of the ink through each nozzle can be controlled in a total of seven levels of gradation (including a non-ejection).

The driver buffer 38 is operated to generate, based on the drive waveform signal Bk_* outputted from the multiplexer 37, a drive signal OUT* having a predetermined voltage (suitable for the recoding head unit 1) and a waveform corresponding to that of the outputted drive waveform signal Bk_*, and then supply the generated drive signal OUT* to each actuator serving for the ejection of the ink from the corresponding nozzle.

While the number of the ink chambers or nozzles provided for each of the recording materials is 94 in the present embodiment, the number may be other than 94, too. In this case, the bit length of each of the shift registers 35, D flip-flop 36, multiplexer (selector) 37 and driver buffer 38 may be adapted to be equal to the number of the ink chambers or nozzles provided for each of the recording materials. Further, the number of the drive waveform signals does not necessarily have to be six, but may be other than six.

There will be next described the operation of the drive circuit 21A of the head driver unit 21.

The drive data signals SIN and the drive waveform signals FIRE cooperate to take the form of the merged signals FIRE_1/SIN_0-0~46, FIRE_2/SIN_1-0~46, FIRE_3/SIN_2-0~46, FIRE_4/SIN_0-47~93, FIRE_5/ SIN_1-47~93, FIRE_6/SIN_2-47~93 into which the drive data signals SIN and the drive waveform signals FIRE are merged, when being serially transmitted, in synchronization with the clock signal CLK, from the gate array 14 to the drive unit 21A of the head driver unit 21 via the flexible flat cable 22. Thus, since the drive data signals SIN and the drive waveform signals FIRE are serially transmitted as the merged signals FIRE/SIN, the number of the signal wires to be necessarily incorporated in the flexible flat cable 22 can be made smaller than where the drive data signals SIN and the drive waveform signals FIRE are transmitted separately from each other.

As shown in FIGS. 1 and 2, the merged signals FIRE_1/SIN_0-0~46, FIRE_2/SIN_1-0~46, FIRE_3/SIN_2-0~46, FIRE_4/SIN_0-47~93, FIRE_5/SIN_1-47~93, FIRE_6/SIN_2-47~93 are outputted from the gate array 14 and inputted to each of the D flip-flop 32 and the shift register 35.

The D flip-flop 32 is operated, in response to the command outputted from the first AND gate 31, to extract the drive-waveform-signal portions WD of the merged signals FIRE_1/SIN_0-0~46, FIRE_2/SIN_1-0~46, FIRE_3/SIN_2-0~46, FIRE_4/SIN_0-47~93, FIRE_5/SIN_1-47~93, FIRE_6/SIN_2-47~93, so as to retrieve the six drive waveform signals FIRE_1~6 and to supply the retrieved drive waveform signals FIRE_1~6 to the multiplexer 37.

That is, the D flip-flop 32 retrieves the six drive waveform signals FIRE_1~6 from the merged signals FIRE/SIN, in response to the placement of the clock signal CLK in the high level state when the drive-waveform-signal-level change indicator signal SEL_WAVE is being placed in the high level state, and outputs the retrieved six drive waveform signals FIRE_1~6. Described specifically, in response to the output of the first AND gate 31 whose level is raised based on a logical product of the first placement of the clock signal CLK in the high level state (i.e., a clock pulse preceding the clock pulse numbered "1") and the first placement of the drive-waveform-signal-level change indicator signal SEL_WAVE, the D flip-flop 32 is operated to output the level of each of the drive waveform signals FIRE_1~6 that is indicated by the drive-waveform-signal portions WD of a corresponding one of the respective merged signals FIRE/SIN. In this instance, since the merged signal FIRE_1/SIN_0-0~46 is in the high level state, the drive waveform signal FIRE_1 is placed in the high level state. This high level of the drive waveform signal FIRE_1 is maintained until the level of the output of the first AND gate 31 is newly raised. Then, when the level of the output of the first AND gate 31 is newly raised as a result of the seventh placement of the clock signal CLK in the high level state (i.e., a clock pulse following the clock pulse numbered "5") that is caused during the high level state of the drive-waveform-signal-level change indicator signal SEL_WAVE, the D flip-flop 32 outputs the level of each of the drive waveform signals FIRE_1~6. In this instance, since the merged signal FIRE_1/SIN_0-0~46 is in the low level state, the drive waveform signal FIRE_1 is placed in the low level state. This low level of the drive waveform signal FIRE_1 is maintained until the level of the output of the first AND gate 31 is newly raised as a result of the thirteenth placement of the clock signal CLK in the high level state (i.e., a clock pulse following the clock pulse numbered "9") that is caused during the high level state of the drive-waveform-signal-level change indicator signal SEL_WAVE. The drive waveform signal FIRE_1 is retrieved by thus extracting the drive-waveform-signal portions WD of the merged signal FIRE_1/SIN_0-0~46. The drive waveform signals FIRE_2~6 are retrieved in the same manner as the drive waveform signal FIRE_1. It is noted that each of the drive waveform signals FIRE_1~6 has at least one drive pulse.

The shift register 35 is operated, in response to the command outputted from the second AND gate 34, to extract the activator-signal portions DD of the merged signals FIRE_1/SIN_0-0~46, FIRE_2/SIN_1-0~46, FIRE_3/SIN_2-0~46, FIRE_4/SIN_0-47~93, FIRE_5/SIN_1-47~93, FIRE_6/SIN_2-47~93, so as to retrieve the drive data signals SIN as the activator signals.

That is, the shift register 35 retrieves the drive data signals SIN from the merged signals FIRE/SIN, in response to the output of the second AND gate 34 whose level is raised by the placement of the clock signal CLK in the high level state when the drive-waveform-signal-level change indicator signal SEL_WAVE is being placed in the low level state. In synchronization with the clock pulses numbered 1-46, the shift register 35 extracts the drive data signal SIN_0-0~46, SIN_1-0~46, SIN_2-0~46, SIN_0-47~93, SIN_1-47~93, SIN_2-47~93 from the merged signals FIRE_1/SIN_0-0~46, FIRE_2/SIN_1-0~46, FIRE_3/SIN_2-0~46, FIRE_4/SIN_0-47~93, FIRE_5/SIN_1-47~93, FIRE_6/SIN_2-47~93. Described specifically, in synchronization with the clock pulse numbered "1", the shift register 35 extracts the three parts of the drive data signal SIN_46 from the respective merged signals FIRE_1/SIN_0-0~46, FIRE_2/SIN_1-0~46, FIRE_3/SIN_2-0~46, and also extracts the three parts of the drive data signal SIN_93 from the respective merged signals FIRE_4/SIN_0-47~93, FIRE_5/SIN_1-47~93, FIRE_6/SIN 2-47~93 (see FIG. 3). Then, in synchronization with the clock pulse numbered "2", the shift register 35 extracts the three parts of the drive data signal SIN_45 from the respective merged signals FIRE_1/SIN_0-0~46, FIRE_2/SIN_1-0~46, FIRE_3/SIN_2-0~46, and also extracts the three parts of the drive data signal SIN_92 from the respective merged signals FIRE_4/SIN_0-47~93, FIRE_5/SIN_1-47~93, FIRE_6/SIN_2-47~93. The operation to extract the drive data signals SIN is interrupted by the extraction of the drive-waveform-signal portions WD, and is repeated until the drive data signals SIN_0~93 for all the nozzles are retrieved and arranged in parallel (S0_0, S0_1, S0_2, S1_0, S1_1, S1_2- . . . S93_0, S93_1, S93_2). It is noted that, as described above, each 3-bit drive data signal SIN serving as the activator signal for activating the corresponding actuator is constituted by the three parts.

The D flip-flop 36 is operated, upon the leading edge of each pulse of the strobe control signal STB transmitted from the gate array 14 of the main circuit 10, to output the 94 activator signals S*_0, S*_1, S*_2 as 94 selection signals SEL_*_0, SEL_*_1, SEL_*_2 that are sup length of the D flip-flop 36 is equal to that of the shift register 35. Me plied to the multiplexer 37. The bit anwhile, the drive waveform signals FIRE_1~6, which are outputted from the D flip-flop 32, are inputted to the multiplexer 37.

The multiplexer 37 selects one of the six drive waveform signals FIRE_1~6, based on the selection signal SEL_*_0, SEL_*_1, SEL_*_2 supplied from the D flip-flop 36. Then, the multiplexer 37 outputs the selected drive waveform signal as the drive waveform signal Bk_*.

The driver buffer 38 generates the drive signal OUT_*, based on the drive waveform signal Bk_* outputted from the multiplexer 37, and then supplies the generated drive signal OUT_* to each actuator, so that the ink is ejected through the corresponding nozzle as a result of activation of the actuator. Thus, the recording operation with gradation control is performed by an ink droplet ejected through each nozzle and corresponding to the waveform (e.g., the number of drive pulses and the pulse width) of the drive waveform signal that is selected based on the activator signal (selection signal SEL_*_0, SEL_*_1, SEL_*_2).

In the recording apparatus of the above-described embodiment that is arranged to perform a color recording operation, the drive waveform signals transmitted to the head driver unit 21 are set to be suitable for characteristics of the respective inks (recording materials).

In the above-described embodiment, the parts of the drive data signals SIN are grouped into six groups, and the parts of the drive data signals SIN of each group and one of the six drive waveform signals FIRE are merged into a corresponding one of the six merged signals FIRE/SIN. However, the parts of the drive data signals SIN may be otherwise grouped so that the merged signals FIRE/SIN are otherwise constituted.

In the above-described embodiment, the logic operation analyzing the clock signal CLK and the drive-waveform-signal-level change indicator signal SEL_WAVE and the logic operation analyzing the clock signal CLK and the output of the inverter 33 are made by the first and second AND gates 31, 34, respectively. However, the first and second AND gates 31, 34 may be replaced with other kind of logic elements.

While the recoding apparatus is of inkjet type in the above-described embodiment, the present invention is equally applicable to a recording apparatus of other type, for example, having an impact recording head or a thermal recording head.

In the above-described embodiment, the multiplexer 37 is operated to select one of the six drive waveform signals FIRE_1~6, based on a desired level of gradation, i.e., a desired degree of recording density (printing density) that is represented by the selection signal. However, the selection of the drive waveform signal may be made by a so-called "history control". Specifically, in the recording apparatus of impact type, the drive waveform signal selection may be made depending upon whether there is any drive data preceding or following the current drive data, so that the selection is made by taking account of vibration remaining in an impact element. In the recording apparatus of thermal type, the drive waveform signal selection may be made depending upon whether there is any drive data preceding or following the current drive data, so that the selection is made by taking account of heat remaining in a heater element.

What is claimed is:

1. A recording apparatus comprising:

(a) a recording head unit having actuators and operable to perform a dot recording operation using at least one recording material that is ejected by activation of said actuators;

(b) a main circuit operable to output activator signals for activating said actuators, and drive waveform signals for controlling ejection of the at least one recording material; and (c) a drive circuit operable to receive said activator signals and said drive waveform signals, generate drive signals based on said output activator signals and said drive waveform signals, and supply the generated drive signals to said actuators, wherein said main circuit has (b-1) a merged-signal generator operable to generate a merged signal into which at least part of said activator signals and at least one of said drive waveform signals are serially merged, and (b-2) a merged-signal transmitter operable to transmit said merged signal to said drive circuit, wherein said drive circuit retrieves said at least part of said activator signals and said at least one of said drive waveform signals from the transmitted merged signal, such that the retrieved at least part of said activator signals and the retrieved at least one of said drive waveform signals are separated from each other, wherein said main circuit transmit, in addition to said merged signal, a clock signal and a drive-waveform-signal-level change indicator signal to said drive circuit, said clock signal being alternately placed in first and second level states thereof, said drive-waveform-signal-level change indicator signal being alternately placed in first and second level states thereof, and being placed in one of said first and second level states at least when said at least one of said drive waveform signals is changed in level, wherein said merged-signal generator generates said merged signal, such that the generated merged signal has (i) drive-waveform-signal portions indicative of the level of said at least one of said drive waveform signals and (ii) activator-signal portions constituted by said at least part of said activator signals, and such that said drive-waveform-signal portions and said activator-signal portions are alternately arranged in the generated merged signal, and wherein said merged-signal transmitter transmits said merged signal, such that said drive-waveform-signal portions are synchronized with placement of said clock signal in one of said first and second level states thereof when said drive-waveform-signal-level change indicator signal is being placed in said one of said first and second level states thereof, and such that said activator-signal portions are synchronized with placement of said clock signal in said one of said first and second level states thereof when said drive-waveform-signal-level change indicator signal is being placed in the other of said first and second level states thereof.

2. The recording apparatus according to claim 1, wherein said drive circuit has (c-1) a drive-waveform-signal retriever operable to retrieve said at least one of said drive waveform signals from the transmitted merged signal, and (c-2) an activator-signal retriever operable to retrieve said at least part of said activator signals from the transmitted merged signal, wherein said drive-waveform-signal retriever extracts said drive-waveform-signal portions of said merged signal in response to the placement of said clock signal in said one of said first and second level states thereof when said drive-waveform-signal-level change indicator signal is being placed in said one of said first and second level states thereof, and retrieves said at least one of said drive waveform signals having the level that is changed as indicated by the extracted drive-waveform-signal portions, and wherein said activator-signal retriever extracts said activator-signal portions of said merged signal in response to the placement of said clock signal in said one of said first and second level states thereof when said drive-waveform-signal-level change indicator signal is being placed in said other of said first and second level states thereof, and retrieves said at least part of said activator signals that constitutes the extracted activator-signal portions.

3. The recording apparatus according to claim 2, wherein said drive-waveform-signal retriever has a logic gate into which said clock signal and said drive-waveform-signal-level change indicator signal are inputted, wherein said drive-waveform-signal retriever further has a drive-waveform-signal-portions extractor operable to extract said drive-waveform-signal portions of said merged signal indicative of the level of said at least one of said drive waveform signals, and wherein said logic gate outputs a command for commanding said drive-waveform-signal-portions extractor to extract said drive-waveform-signal portions, in response to the placement of said clock signal in said one of said first and second level states thereof when said drive-waveform-signal-level change indicator signal is being placed in said one of said first and second level states thereof.

4. The recording apparatus according to claim 3, wherein said drive-waveform-signal-portions extractor is provided by a D flip-flop into which said merged signal and said command are inputted, and wherein said D flip-flop retains the level of said at least one of said drive waveform signals that is indicated by each of said drive-waveform-signal portions of said merged signal, until a subsequent one of said drive-waveform-signal portions is extracted.

5. The recording apparatus according to claim 2, wherein said activator-signal retriever has a logic gate into which said clock signal and said drive-waveform-signal-level change indicator signal are inputted, wherein said drive-waveform-signal retriever further has a serial-parallel converter operable to extract said activator-signal portions of said merged signal constituted by said at least part of said activator signals that is serially arranged, and to output said at least part of said activator signals that is arranged in parallel, and wherein said logic gate outputs a command for commanding said serial-parallel converter to extract said activator-signal portions, in response to the placement of said clock signal in said one of said first and second level states thereof when said drive-waveform-signal-level change indicator signal is being placed in said other of said first and second level states thereof.

6. The recording apparatus according to claim 5, wherein said activator-signal retriever further has a D flip-flop operable to receive said at least part of said activator signals outputted by said serial-parallel converter, and to latch said at least part of said activator signals.

* * * * *

UNITED STATES PATENT AND TRADEMARK OFFICE

CERTIFICATE OF CORRECTION

PATENT NO. : 7,575,291 B2
APPLICATION NO. : 11/449602
DATED : August 18, 2009
INVENTOR(S) : Isao Kobayashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this

Seventh Day of September, 2010

David J. Kappos
*Director of the United States Patent and Trademark Office*